US009971962B2

(12) United States Patent
Phillips et al.

(10) Patent No.: US 9,971,962 B2
(45) Date of Patent: May 15, 2018

(54) METHOD AND SYSTEM FOR APPLYING INK MARKINGS ON FOOD PRODUCTS

(71) Applicant: YTA HOLDINGS, LLC, Los Angeles, CA (US)

(72) Inventors: Jonathan R. Phillips, San Juan Capistrano, CA (US); Richard C. Blackburn, Santa Ana, CA (US)

(73) Assignee: YTA HOLDINGS, LLC, Los Angeles, CA (US)

(*) Notice: Subject to any disclaimer, the term of this patent is extended or adjusted under 35 U.S.C. 154(b) by 0 days. days.

(21) Appl. No.: 15/006,033

(22) Filed: Jan. 25, 2016

(65) Prior Publication Data

US 2016/0217351 A1 Jul. 28, 2016

Related U.S. Application Data

(60) Provisional application No. 62/107,391, filed on Jan. 24, 2015.

(51) Int. Cl.
*G06K 15/02* (2006.01)
*A01K 43/10* (2006.01)
*B41J 3/00* (2006.01)

(52) U.S. Cl.
CPC ............ *G06K 15/02* (2013.01); *A01K 43/10* (2013.01); *B41J 3/00* (2013.01)

(58) Field of Classification Search
CPC . B41J 3/4073; B41J 3/00; A23L 15/00; A01K 43/10; A01K 43/04; B41F 17/30; B41F 17/34; G06K 15/02
See application file for complete search history.

(56) References Cited

U.S. PATENT DOCUMENTS 7,460,921 B2 12/2008 Sullivan
8,091,791 B2 1/2012 Bremond
(Continued)

FOREIGN PATENT DOCUMENTS

WO WO 2011091011 A1 7/2011

OTHER PUBLICATIONS

International Search Report from corresponding PCT Application No. PCT/US2016/014777 dated Mar. 31, 2016 (2 pgs.).
(Continued)

*Primary Examiner* — David Banh
(74) *Attorney, Agent, or Firm* — Hankin Patent Law, APC; Susan L. McCain; Sergio Becerra

(57) ABSTRACT

The present disclosure includes a method and system for applying ink markings on a food product in such a manner to form a permanent marking thereon. The markings include text and graphics, and can include an advertisement, freshness information, traceability data, or other types of relevant information, or any combination thereof. The method preferably forms the markings on the food product while the product moves through a predetermined region of a food processing system. Preferably, the ink marking assembly is located above the food products to be marked and the products are marked while passing thereunder. The performance or characteristics of the marking device may be adjusted in response to selected characteristics of the food product, environmental conditions, processing conditions, compliance requirements, and the like, in order to optimize the marking process.

18 Claims, 7 Drawing Sheets

(56) References Cited

U.S. PATENT DOCUMENTS

| | | | | |
|---|---|---|---|---|
| 8,455,030 B2* | 6/2013 | Chait | ................ | B65B 23/06 |
| | | | | 101/35 |
| 8,499,718 B2* | 8/2013 | Chait | ................ | A01K 43/10 |
| | | | | 119/50.7 |
| 2002/0011311 A1* | 1/2002 | Carignan | ............ | B65C 9/1869 |
| | | | | 156/350 |
| 2003/0080191 A1 | 5/2003 | Lubow | | |
| 2004/0220855 A1* | 11/2004 | Carignan | ............ | B65C 9/1869 |
| | | | | 705/14.49 |
| 2006/0075329 A1* | 4/2006 | Sullivan | ............. | B65B 61/26 |
| | | | | 715/221 |
| 2009/0256897 A1* | 10/2009 | Polk | ................ | B41J 3/4073 |
| | | | | 347/104 |
| 2013/0000499 A1 | 1/2013 | Ookubo | | |

OTHER PUBLICATIONS

Written Opinion of the International Searching Authority from corresponding Application No. PCT/US2016/014777 dated Mar. 31, 2016 (6 pgs.).

* cited by examiner

METHOD AND SYSTEM FOR APPLYING INK MARKINGS ON FOOD PRODUCTS

CROSS REFERENCE TO RELATED APPLICATIONS

This application claims the benefit of U.S. Provisional Application No. 62/107,391 filed on Jan. 24, 2015, the contents of which are incorporated herein by reference in its entirety.

BACKGROUND

This disclosure relates generally to the field of food product processing, and more particularly methods and systems for optimizing ink markings applied on food products. While reference is made herein to eggs in particular, it should be understood that this disclosure is directed to all food products in which ink markings may be applied thereon.

In the egg packing industry, eggs typically undergo a great deal of processing before they are ready to be sold to the consuming public. In many circumstances, for example, eggs pass through several processing stations where they are washed, candled, weighed, graded, and packed into packages (e.g., cartons, crates, or other commercially distributed containers). Examples of such processing stations and mechanisms for conveying eggs from station to station are described, for instance, in the following U.S. patents assigned to Diamond Automations, Inc. (U.S. Pat. Nos. 4,189,898; 4,195,736; 4,505,373; 4,519,494; 4,519,505: 4,569,444; 4,750,316; 5,321,491; and 6,056,341) and TEN Media LLC (U.S. Pat. No. 8,455,030), which are incorporated herein by reference in their entirety. As a reference, it is not uncommon for a facility in which these stations operate to output about one million eggs in a single day. Accordingly, to be commercially acceptable, the throughput of the stations needs to be quite high, with some stations typically processing on the order of 20,000 eggs per hour.

The egg packing industry uses devices known as "packers" to pack the eggs into the packages. Typically, a packer includes a conveyor (e.g., a belt conveyor, roller conveyor, chain conveyor, etc.) that moves empty packages through an egg loading section (where the eggs are loaded into the egg loading section from above) and then moves the filled packages to a package closing section that is responsible for closing the lids of the packages. The eggs may be supplied to the egg packer via a grader system.

An egg packing process that uses "packers," typically uses bulk belts to bring eggs from a bulk supply location. The eggs are cleaned or disinfected, in some instances using UV light while clamped to transport chains, in some instances through immersion in sanitizing wash water. The eggs are then inspected either electronically or manually, they are weighed to establish size, inspected for cracks using ultrasonic inspection and loaded into a chain driven carriage mechanism ("Transfer Loader"). The egg is then normally transported to one of a plurality of packing machines by the aforementioned carriage mechanism. The particular packing machine to which any individual egg may be transported is determined by a computer. This process or elements thereof up to but not including the packing machine constitute ("Grading" and the "Grader"). The carriage mechanism typically consists of one or a plurality of chains, running the length of the Grader past all the packing machines in the horizontal plane ("Grader Chains"). The packing machines are usually configured with an egg flow perpendicular to the Grader Chain in the horizontal plane.

The egg industry uses Continuous Inkjet Printer technology ("CIJ Printers") to print Size, Grade and Date information together with other information or images and logos on to the surface of an egg shell ("Data") of a fresh egg travelling through an egg grading machine. The CIJ Printers are traditionally placed in a location on the production line that is responsible for grading the eggs and the site for such installation is chosen to minimize the number of CIJ Printers required for a given installation. CIJ Printers have typically been installed on the Grader Chain as near to the Transfer Loader as practical, and typically (although not always), prior to all the packing machines to which almost all eggs are later diverted.

As a consequence of the location, the CIJ Printer provides a relatively economic means of applying Data that limits the number of printing heads. Like most processing methods the execution of these installs represents a compromise of many factors, and the method described above has disadvantages which adversely affect the equipment, retailers, and consumers of eggs negatively. The negative elements of the known method described above include:

a) The CIJ Printer's print-head is installed inverted below the flow of eggs;

b) Egg debris or broken eggs can fall into the jetting mechanism of the inkjet printer causing downtime and impeding print quality;

c) The flow of ink is upward and therefore stray ink can fall backwards and result in downtime and maintenance issues;

d) The linear speed of the eggs as they pass the print-head is fast and therefore the amount of data that can be printed is limited by the limitations of maximum print speed performance;

e) The linear speed of the eggs as they pass the print-head is fast and therefore the print quality achieved is typically poor quality;

f) The eggs usually travel in the Grader Chain clamped long ways and therefore the print applied to the eggshell is on the side of the egg in a print direction equal to the direction of egg travel (from top of the egg to bottom (or vice versa) with such print being normally unreadable by a consumer without handling the eggs in the carton because only the top of the egg is normally visible in a carton;

a. Handling the eggs in a carton can lead to contamination of the egg; and b. Handling of the egg in the carton can lead to increased levels of breakage by consumers inspecting eggs in the retail store where they are sold;

g) The eggs are generally printed before the grader stations and therefore close to the disinfection or washing process. In the case of the latter, the CIJ Printer may be forced to print onto eggs that are still wet, since they have not had time to dry in the high speed process of grading, further reducing print quality and performance of the printing, occasionally causing the ink to seep deep into the egg shell and through it, causing discoloration of the inside of the egg by the ink h) A reasonable high proportion of eggs will have very poor or unreadable marks due to a combination of these factors; and i) If an egg has brand data printed on it, or size data printed on it and the grader has a minor malfunction, an egg can be inadvertently diverted (or fall) from the Grader at an unplanned Packing Machine (i.e. not the one the computer had intended) because the plurality of packing lanes often process multiple brands of eggs currently a badly a branded or sized egg appearing in the wrong carton can be a legal and public relations issue and can cause both consumer and retailer dissatisfaction.

As such, there is a need in the art for a system and method to improve the reliability and quality of the printing approach used in the egg packing industry.

BRIEF SUMMARY

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with embodiments herein, the present disclosure includes a method and system for applying ink markings on a food product in such a manner to form a permanent marking thereon. The markings include text and graphics, and can include an advertisement, freshness information, traceability data, or other types of relevant information, or any combination thereof. Desirably, the marking is applied so as to leave much of the area of the food product unaffected so as to form contrast between the unaffected areas and the marking. The method preferably forms the markings on the food product while the product moves through a predetermined region of a food processing system. The performance or characteristics of the marking device may be adjusted in response to selected characteristics of the food product, environmental conditions, processing conditions, compliance requirements, and the like, in order to optimize the marking process.

In accordance with embodiments herein, the present disclosure includes an apparatus for applying markings on food products that is operable in association with a an egg-handling machine that performs washing, candling, grading, and packing of eggs. The apparatus comprises a marking assembly located in proximity to the egg-handling, so that the marking assembly directs ink onto the food product and forms markings thereon. The marking assembly is preferably located above the eggs to be marked. In a preferred embodiment, the marking is applied on the shell of the egg while the egg is positioned in an associated egg carton. The egg may also be raw or pasteurized. The marking may be applied by continuous inkjet printing technology, drop-on-demand technology, and the like. The markings may be formed by a generally stationary printing source as the egg is transported past the source.

In some embodiments, the present disclosure provides a method and system for applying markings on food products, comprising conveying the food product to a marking station having at least one marking device configured to apply markings on the food product, and activating the marking device to mark the indicia thereon. The indicia includes text and graphics, and can include an advertisement or other graphical image, freshness information, traceability data, or other types of relevant information, or any combination thereof. In a preferred embodiment, the food product is an egg, and the marking device applies the indicia on the outer surface of the shell of the egg.

In accordance with the embodiments herein, wherein the at least one marking device is located above the eggs on which the marking is to be applied, results in optimized printing on the eggs such that a more consistent mark is achieved and variations in marking quality are reduced and/or eliminated. In some embodiments, the marking assembly includes multiple marking devices which mark the egg simultaneously as the egg passes thereby. As the speed of the printing is so controlled, there are fewer restrictions on the amount of data printed and the quality of the print is improved. In addition, as in some embodiments, the marking is performed from above the eggs, the data printed on the eggs is on the consumer facing surface of the egg shell and readable by the consumer. This results in a reduction of the need for physical handling of the eggs in the carton by the consumer, which reduces contamination and breakage. Further, as the eggs are suitably printed once already placed into their branded egg container, the need to match the eggs to their container is obviated, reducing consumer and retailer dissatisfaction.

Still other advantages, aspects and features of the subject disclosure will become readily apparent to those skilled in the art from the following description wherein there is shown and described a preferred embodiment of the present disclosure, simply by way of illustration of one of the best modes best suited to carry out the subject disclosure As it will be realized, the present disclosure is capable of other different embodiments and its several details are capable of modifications in various obvious aspects all without departing from the scope herein. Accordingly, the drawings and descriptions will be regarded as illustrative in nature and not as restrictive.

BRIEF DESCRIPTION OF THE DRAWINGS

The accompanying drawings incorporated herein and forming a part of the specification illustrate the example embodiments.

DETAILED DESCRIPTION OF THE PREFERRED EMBODIMENTS

Figure 1:
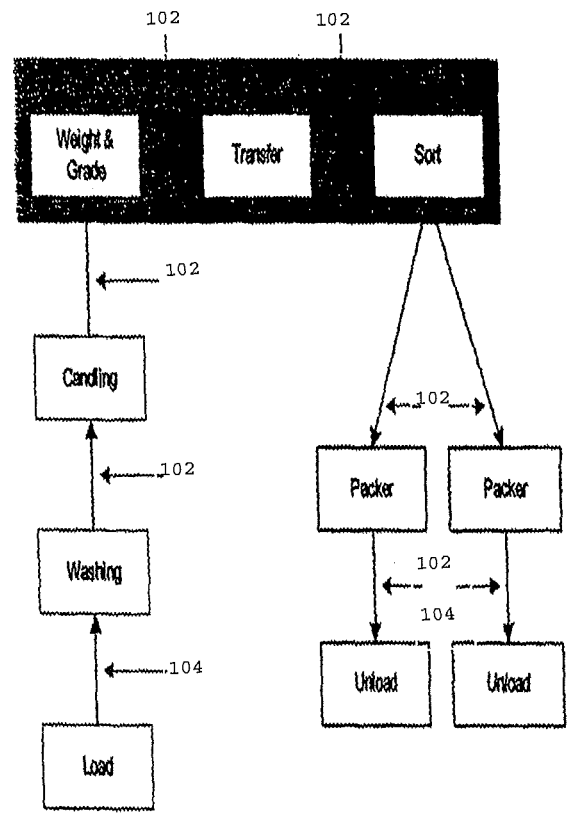
FIG. 1 is a block diagram depicting portions of an egg-handling machine and particularly illustrating inline and offline operations.

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In general, the embodiments herein provide methods and systems for marking information and other relevant data on food products and associated packaging. Embodiments of the present disclosure are directed to an apparatus as well as a method for marking food products as they pass through a marking station, with the marking being carried out by marking devices that are designed and configured to render text and graphic representations as the food products pass through the marking station. The performance or characteristics of the marking device may be adjusted in response to selected characteristics of the food product, environmental conditions, processing conditions, compliance requirements, and the like, in order to optimize the marking process.

While reference is made herein to eggs in particular, it should be understood that this disclosure is directed to all food products in which a mark may be applied thereon. In the example embodiment, there is provided a method and system for applying markings on an egg by a marking device so as to form a permanent marking. However, it is to be appreciated that the embodiments of the claims herein are not limited in any way to the example embodiment, but rather are to be interpreted to cover applying markings to other suitable food products.

It is further understood that the preferred embodiment for applying a marking on eggs is by applying ink to the shell of the egg so as to cause discoloration of the egg shell to form a permanent marking thereon. However, it is to be appreciated that the embodiments contained herein are not limited to the preferred embodiments, but rather are to be interpreted to cover applying markings by any suitable marking device.

In another embodiment of the present disclosure, a marking device may be placed in proximity of an existing egg-handling machine. Egg-handling machines includes any device or apparatus that will control the movement of an egg along a path, including egg-grading machines. The marking device can be placed in proximity to the egg-handling machine so that the markings may be applied to the egg inline. The egg-handling machine moves an egg along a conveyor apparatus in a particular direction. A marking device is placed in proximity to the conveyor apparatus such that marking device is directed towards the egg.

There are many variations of egg-handling machines. Most perform some common minimal basic functions. FIG. 1 is a block diagram outlining the basic functions of those machines. The eggs move through these machines 100 while these basic functions are performed, and a radiant energy source can be placed inline 102 or offline 104 in between many of these functions to perform a method of the present disclosure. The eggs are loaded into the machine. An offline procedure may be performed after this function. The eggs are then washed, after which an inline method may be performed. The eggs are candled, after which an inline method may be performed. The eggs move to the grading portion of the machine where they are weighed and graded, after which an inline method may be performed. The eggs are then transferred to a sorter, before which an inline method may be performed. The eggs are then sorted by grades and sizes, after which an inline method may be performed. The eggs are placed into a package, after which an inline method may be performed. An offline process 104 can be performed prior to the load processor and, typically involves human intervention or some other form of mechanical intervention alien to the egg-handling machine. In preferred embodiments of the present disclosure, the marking device can be associated with an existing egg-handling machine without appreciably modifying the machine. The egg-handling machine preferably includes sensors or other suitable monitoring devices for monitoring the operational and environmental parameters of the egg-handling machine.

Figure 2:
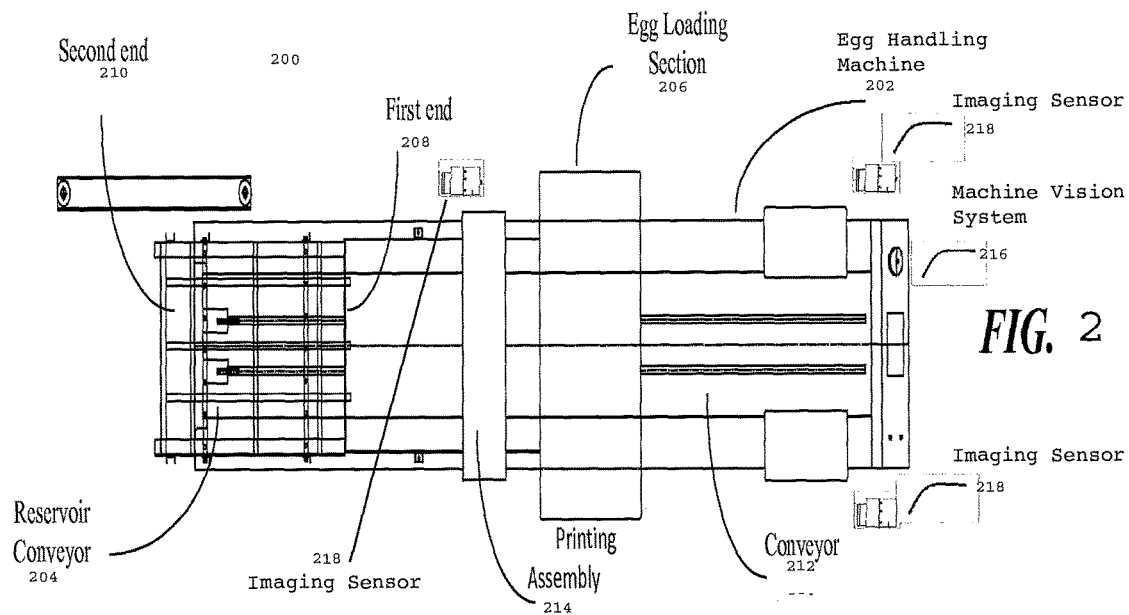
FIG. 2 is a diagrammatic view depicting an apparatus for performing an embodiment of the method of the present disclosure.
Figure 3:
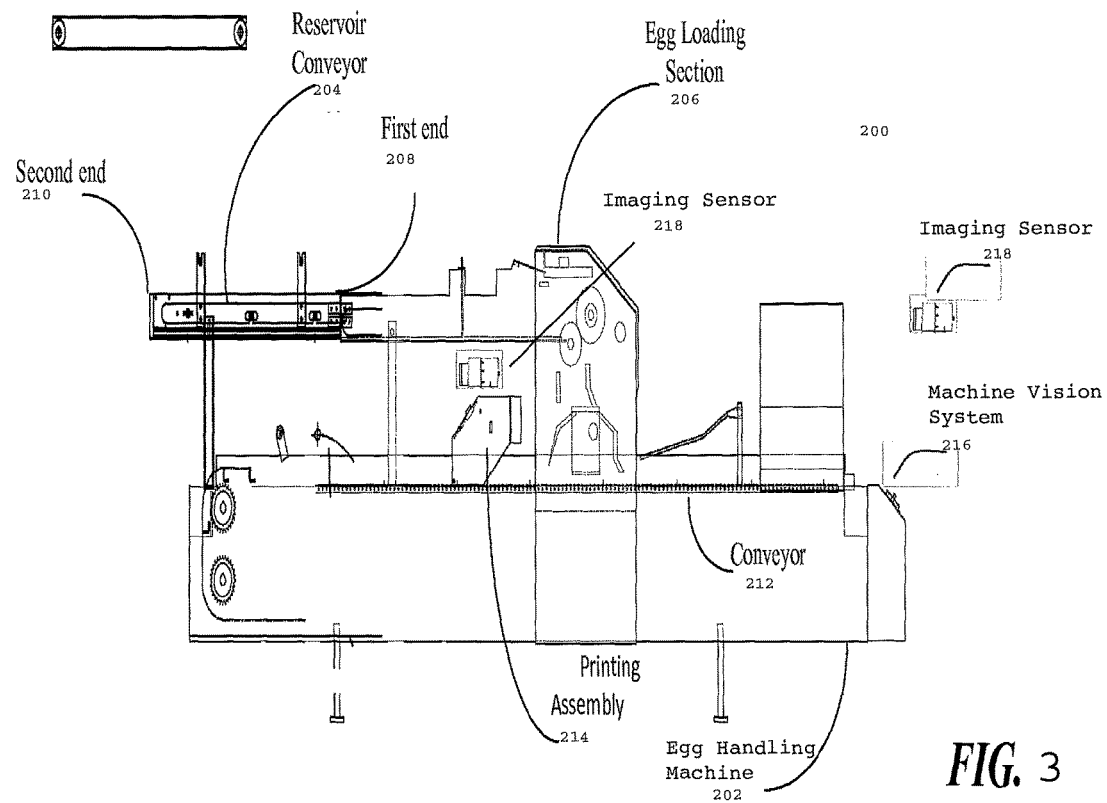
FIG. 3 is a diagrammatic view depicting an apparatus for performing an embodiment of the method of the present disclosure.

FIG. 2 illustrates a top-view of a system diagram of an example embodiment of a marking apparatus 200 that is operable in association with an egg-handling machine 202 that performs washing, candling, grading, and packing of eggs as discussed above. The apparatus includes at least one printing assembly 214 comprised of at least one ink printing source operable to apply markings on eggs. FIG. 3 illustrates a side view of the system diagram of an example embodiment of a marking apparatus 200 that is operable in association with egg-handling machine 202. While reference is made herein to eggs in particular, it should be understood that the same principles and features may be applied to an apparatus for applying marks on other suitable food products. Further, while reference is made to a printing assembly comprised of at least one ink printing source, it should be understood that any suitable marking device may be used.

A reservoir conveyor 204 is connected to an egg loading section 206 of the egg handling machine 202 at first end 208 and an egg grading machine (not shown) at second end 210. In an example operation, eggs are passed from the egg grading machine (not shown) to the reservoir conveyor 204 via the second end 210. The reservoir conveyor 204 then passes the eggs along the conveyor to the first end 208 and then to the egg loading section 206. The egg loading section 206 then receives an egg package (not shown) along a conveyor 212 and then deposits a plurality of eggs into the egg package. The eggs are deposited in the egg package such that the egg package is open and at least a portion of each of the eggs is accessible. In most instances, at least a portion of the eggs extend above the open egg package. Typically the eggs do not travel continuously down the conveyor belt of conveyor 212. Instead as each set of eggs are placed in the egg package at the egg loading section 206, a pause in the conveyor belt of the conveyor 212 occurs. During this pause or dwell time, the at least one ink printing source in the printing assembly 214 prints data on at least one of the eggs in the open egg carton. Preferably, the at least one ink printing source prints data on each of the eggs in the open egg carton.

The printing assembly may be configured in various configurations depending on the markings to be applied onto the eggs and the egg processing speed required in different embodiments or environments. For example, in one embodiment, the printing assembly 214 may be situated at the side of the conveyor 212 at a position where a portion of the egg carton is located below the at least one ink printing source. In another embodiment, the at least one ink printing source may be mounted on a linear slide in the printing assembly 214 that moves parallel to the row of eggs during the dwell time and perpendicular to the direction of the conveyor belt of the conveyor 212. Thus, the at least one ink printing source prints from above the eggs contained in the egg package. The markings may include text, graphics, images, other types of indicia, and any combination thereof. In a preferred embodiment, the markings include text and graphics, and can include an advertisement, freshness information, traceability data, or other types of relevant information, or any combination thereof. In those embodiments in which the ink printing source prints from above the eggs, egg debris and/or broken eggs will not fall onto the ink printing source and therefore, will not cause downtime or impede print quality.

It is be understood that the at least one printing assembly may be positioned at any suitable location for marking on the food products and that the location referenced herein is only for example purposes. Further, the apparatus may include multiple printing assemblies and such printing assemblies may be configured or positioned as required for effective processing.

Figure 4:
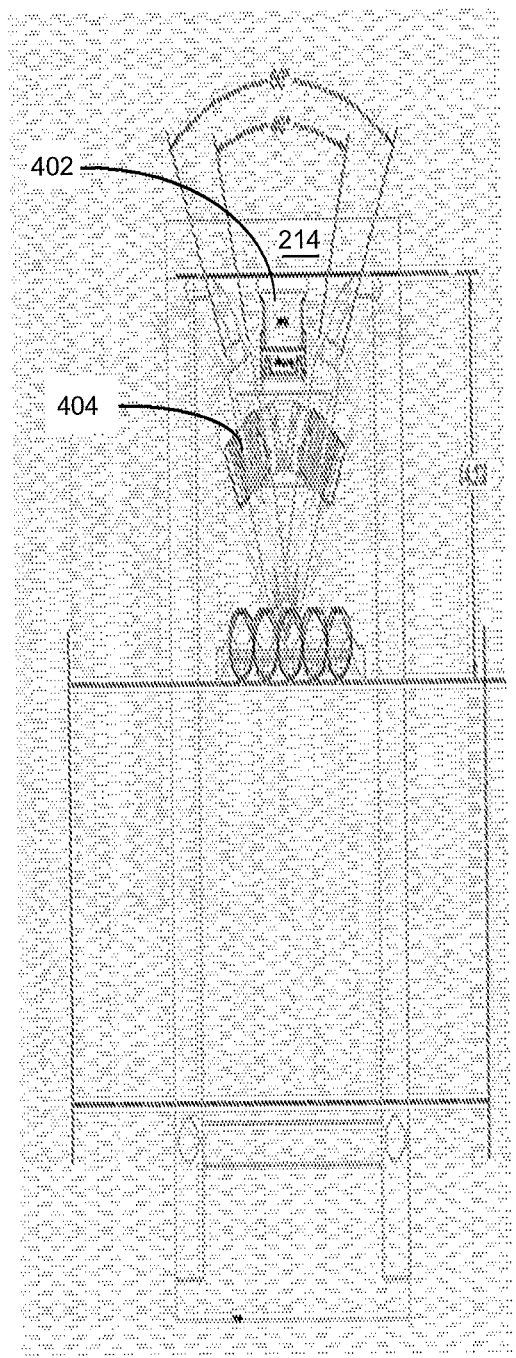
FIG. 4 is a diagrammatic view depicting a marking assembly for performing an embodiment of the method of the present disclosure.

FIG. 4 is a diagram of one embodiment of the printing assembly 214 of FIGS. 2 and 3. The printing assembly 214 includes at least one ink printing source. Preferably, the printing assembly 214 includes a rotating rod 402 that rotates and causes at least one print head 404 to travel over the eggs located in the egg container. In a preferred embodiment, the at least one print head 404 is similar to a print head used in ink jet printers and functions in a similar manner. It should be understood that the at least one print head 404 is located above the eggs and may have ink supplied from above the print head. The ink may suitably be supplied via a tube from a large reservoir or via cartridges coupled to the print head. The printing assembly is in communication with an associated computer system as discussed in detail below that controls the operation of the printing assembly and the at least one ink printing source contained therein.

Suitable ink-based marking systems include non-contact systems that do not require direct contact of the printing system with the egg carton, such as a continuous inkjet printing system ("CIJ"). Such system is preferably mounted on the Packer and traverses across the egg cartons, applying markings thereon. The CIJ printing system could include a single-jet CIJ printer, a dual-jet CIJ printer, or a Binary Array type of CIJ printer. In another embodiment, the system includes multiple ink sources, such as six, and each ink source marks a separate column as the eggs pass thereunder.

Other embodiments of inkjet systems may use a 'drop-on-demand' technology, which has the potential for higher-resolution marks, as well as being lower cost, and less maintenance-intensive, than other inkjet technologies. This latter system configuration may use ink cartridges (as opposed to a large reservoir and associated pumps, valves, etc) and has a good potential for creating high-quality desirable sponsored images, since it has significantly higher resolution than the traditional CIJ inkjet options noted above. Suitable drop-on-demand inkjet technologies include Thermal Inkjet (TIJ), Piezo-electric Inkjet, and MEMS-based Inkjet.

In the preferred embodiment, the printing assembly 214 having at least one ink printing source is mounted on the packer in such a manner that the at least one printing source traverses over the eggs in the carton. Such an arrangement allows for the printing speed to be more controlled than in those embodiments in which the printing assembly is mounted on the Grader Chain. The printing speed in such an embodiment mounted on the packer and traversing over the eggs is slower. A lower speed results in more information be able to be printed in each pass, a higher quality of the information printed thereon, and the like. In addition, it allows for higher quality raster technology to be used.

Figure 5:
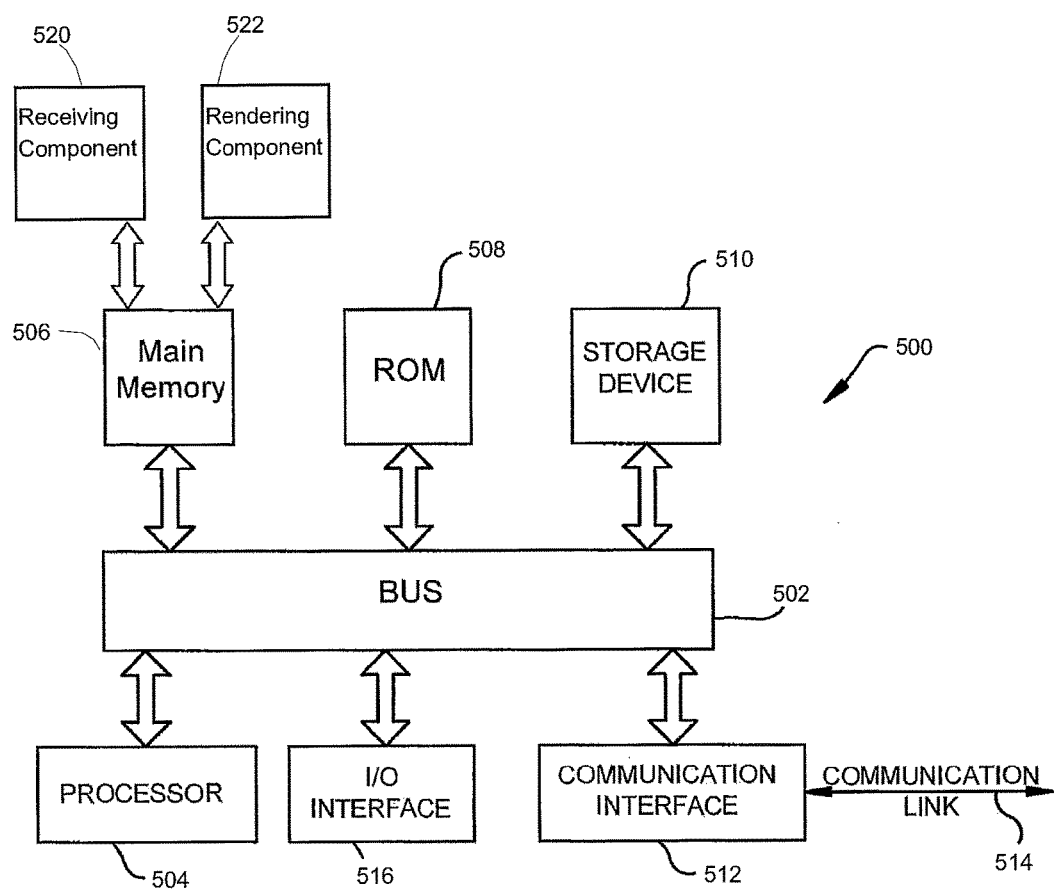
FIG. 5 illustrates an example of a computer system 500 upon which an example embodiment may be implemented.

FIG. 5 illustrates an example of a computer system 500 upon which an example embodiment may be implemented. Computer system 500 is suitable for implementing the functionality of any embodiment of the apparatus 200 described herein in FIGS. 2 and 3.

Computer system 500 includes a bus 502 or other communication mechanism for communicating information and a processor 504 coupled with bus 502 for processing information. Computer system 500 also includes a main memory 506, such as random access memory (RAM) or other dynamic storage device coupled to bus 502 for storing information and instructions to be executed by processor 504. Main memory 506 also may be used for storing a temporary variable or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, optical disk, SD memory and/or flash storage, is provided and coupled to bus 502 for storing information and instructions.

An aspect of the example embodiment is related to the use of computer system 500 to implement the method and system for applying markings to food products. According to an example embodiment, instructions are provided by computer system 500 in response to processor 504 executing one or more sequences of one or more instructions contained in main memory 506. Such instructions may be read into main memory 506 from another computer-readable medium, such as storage device 510. Execution of the sequence of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 504 for execution. Such a medium may take many forms, including but not limited to non-volatile media, and volatile media. Non-volatile media include, for example, optical or magnetic disks, such as storage device 510. Volatile media include dynamic memory, such as main memory 506. As used herein, tangible media may include volatile and non-volatile media. Common forms of computer-readable media include, for example, floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read. Various forms of computer-readable media may be involved in carrying one or more sequences of one or more instructions to processor 504 for execution. The instructions may optionally be stored on storage device 510 either before or after execution by processor 504.

The computer system 500 also includes a communication interface 512 coupled to bus 502, for providing a two-way data communication coupling computer system 500 to communication link 514. Communication link 514 typically provides data communication to other networks or devices. Although the illustrated example has one communication interface 512 and one communication link 514, those skilled in the art should readily appreciate that this is for ease of illustration, as the example embodiments described herein may have any physically realizable number of communication interfaces 512, and/or communication links 514. The computer system 500 may further include at least one input/output interface 516 connected to the bus 502 and in data communication with one or more user interface devices, such as a mouse, keyboard, monitor/screen, etc. (not explicitly shown).

Notably, while the illustrative embodiment described below shows a single computer system as performing the functions described herein, it is understood that the computer system 500 may comprise, either as a single computer system or as a collection of computer systems, one or more memories, one or more processors, and one or more network interfaces etc., as may be appreciated by those skilled in the art.

The computer system 500 is operable to control the operation of the printing assembly and the at least one ink printing source contained therein. The computer system 500 is also operable to receive and/or generate data files for producing or generating movement of the marking device to produce the desired markings. The computer system 500 is operable to control various parameters of the marking device, enabling optimization of the performance the marking process.

In a preferred embodiment, the computer system 500 is operable to control the operation of the printing assembly and the at least one ink printing source contained therein. The computer system 500 is also operable to receive and/or generate printing data files containing information for producing or generating movement of the marking device to produce the desired markings. The computer system 500 is operable to control various parameters of the ink printing source to optimize the printing performance with respect to desired resolution, quality, integrity, regulatory compliance, and the like of the applied marks. The magnitude and character of these parameters may be associated with the printing information and stored in memory and programmably varied according to the desired results.

The computer system 500 is preferably interconnected with other computer systems, sensors devices, and other devices associated with other machines, systems, networks, and the like that interact with the apparatus 200 as set forth in FIGS. 2 and 3. For example, the computer system 500 is preferably interconnected with the computer system that controls and monitors the operation of the egg-handling machine 202. The computer system preferably receives environmental and product information from the egg-handling machine, such as wash water temperature, rinse water temperature, wash water pH values, egg origin and characteristic information, and the like. The computer system also preferably receives information from position sensors which monitor the operating status of all important moving components of the apparatus 200.

In one embodiment, the environmental information, product information, positional information, and other relevant processing information may be obtained using image capturing devices, machine-readable or human-readable sensors and identifiers, radio frequency identification transponders (RFID) or other transmitting sensors, time stamps or biometric identification, object recognition, texture definition, database management, and other software, data interface equipment consisting of serial, parallel, or network communication, binary data such as switches, gates, push buttons, current sensors, as well as additional forms of data input.

The computer system 500 processes the obtained data and uses such data in the control and operation of the printing assembly as well as the associated egg-handling machine. By adjusting the characteristics of the marking applied thereon, a more consistent mark is achieved and variations of marking quality, resolution, integrity, regulatory compliance, and the like between different types of eggs, environments, and the like may be reduced and/or eliminated.

Egg origin and characteristics of the eggs on which the marking is to be applied, or the environmental or processing conditions to which the eggs are subject, may affect the quality of the mark to be applied thereon. These factors include, but are not limited to:

Shell composition (chemical);
Shell composition (mechanical features);
Shell thickness;
Percentage of cuticle remaining;
Shell strength;
Species of bird (chicken, ducks, turkeys, etc.);
Breed of bird;
Feed for bird;
Water source for bird;
Barn temperature;
Molt cycle;
Age of bird;
Age of the egg
Color of egg;
Egg weight (individual and package);
Egg grade;
Egg surface temperature at time of lasing;
Egg wetness at time of lasing;
Egg internal temperature at time of lasing;
Thermal conductive coefficient of egg shell;
Curvature of egg relative to the marking;
Egg washing process parameters;
Egg rinsing parameters;
Egg drying parameters;
Temperature and humidity in the packing facility;
Time of day;
Egg packaging parameters;
Peak temperature reached;
Movement of egg during marking; and
Temperature of air local to marking point.

Data relating to the characteristics associated with eggs or the processing or environmental conditions may be obtained by any suitable means. For example, the egg origin and characteristic information of the eggs may be obtained from the source providing the eggs, inspection/examination prior to the processing, data obtained from previous processing of similar types of eggs, data received or obtained by the computer system 500 during monitoring of the marking process, or any other means. Data relating to the environmental conditions, processing parameters, and the interaction of the markings with the egg shell may be obtained from previous processing of similar types of eggs, data received or obtained by the computer system 500 during monitoring of the marking process, or any other means. The computer system preferably stores the data in memory and uses such data as necessary in the control and operation of the printing assembly as well as in the control and operation of the egg-handling machine.

The printing performance parameters may be suitably set or adjusted based on the egg characteristics, environmental conditions, processing conditions, interaction with the markings and the egg shell, and combinations thereof. In a preferred embodiment, the computer system 500 controls various parameters of the printing assembly and the at least one ink printing source to optimize the marking process. The parameters that may be set or adjusted include, but are not limited to:

Type of ink;
Ink supply;
Drops per inch capability;
Speed of traverse of the ink printing source over the surface of the object being marked;
Configuration of character fonts;
Configuration of any graphical objects to be marked;
Raster selection;
Amount and configuration of data to be marked;
Print Height;
Print Width;
Spacing between consecutive eggs in a carton; and
Throw distance to the eggs, to suit the specific design of the cartons being processed.

The printing performance parameters may be set or adjusted prior to the marking process, the marking process in response to data obtained during processing, or any combination thereof. The printing performance parameters may be set or adjusted per egg, per batch, per run, or any combination thereof. Preferably, the printing performance parameters are adjusted to optimize the marking applied thereon such that a more consistent marks is achieved and variations in marking quality are reduced and/or eliminated.

Figure 6:
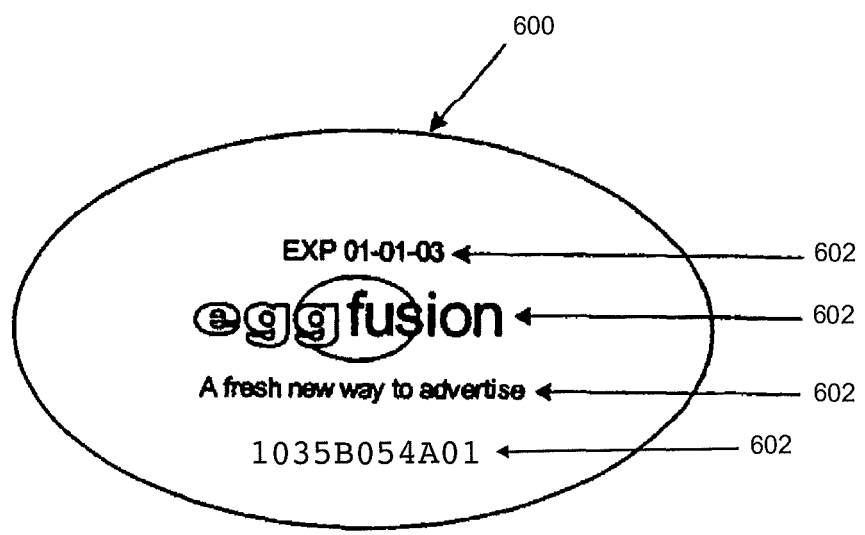
FIG. 6 is a diagram depicting an egg bearing markings using method and apparatus embodiments of the present disclosure.

FIG. 6 is a diagram illustrating an egg 600 having indicia marked thereon 602 in accordance with the present disclosure. The information marked thereon may include text, graphics, images, other types of indicia, and any combination thereof, and can include an advertisement or other promotional information, freshness information, traceability data, or other types of relevant information.

Figure 7:
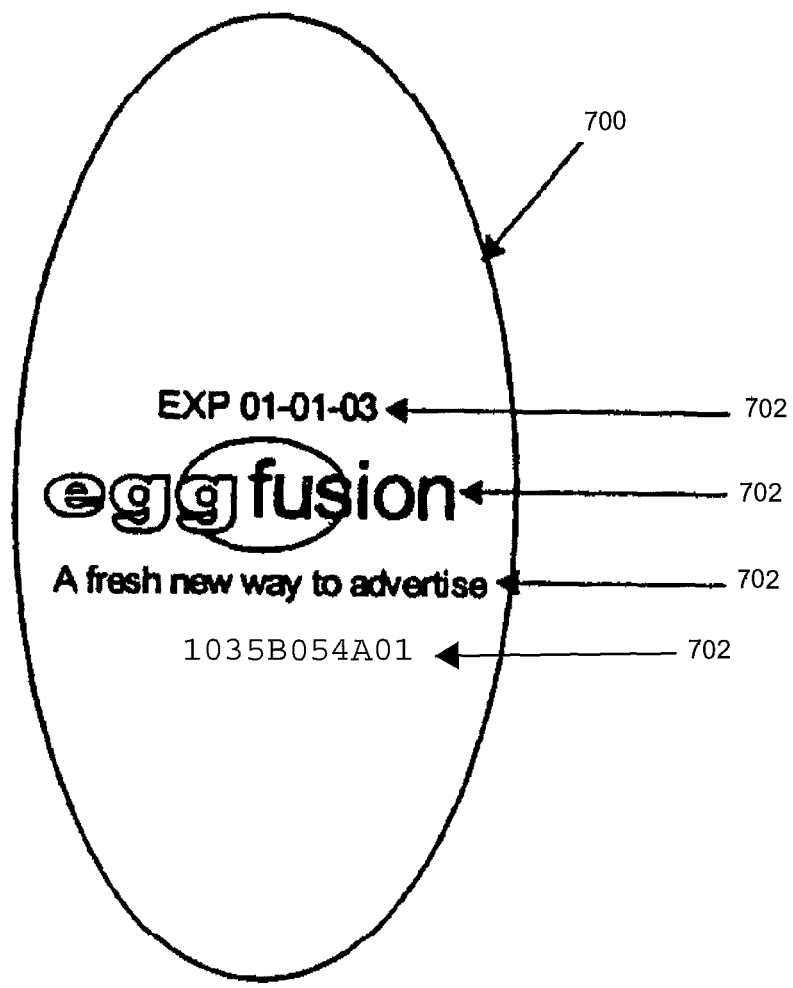
FIG. 7 is a diagram depicting an egg bearing markings using the method and apparatus embodiments of the present disclosure.

FIG. 7 is a diagram illustrating an egg 700 having indicia marked thereon 702 in accordance with the present disclosure. The information marked thereon may include text, graphics, images, other types of indicia, and any combination thereof, and can include an advertisement or other promotional information, freshness information, traceability data, or other types of relevant information.

Figure 8:
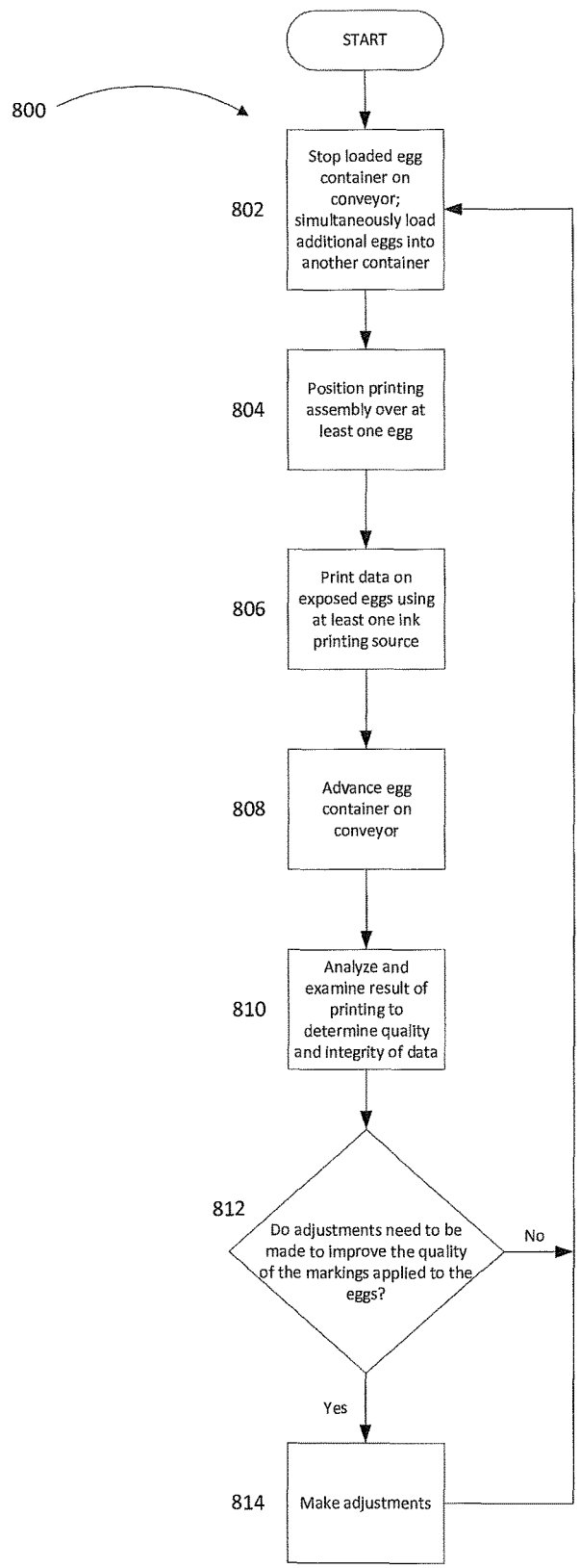
FIG. 8 is an example flow diagram of marking on eggs with the apparatus as shown in FIGS. 2 and 3 in accordance with an example implementation.

FIG. 8 is an example flow diagram 800 of marking on eggs with the apparatus 200 as shown in FIGS. 2 and 3 in accordance with an example implementation. An egg carton stops for a predetermined period of time under the egg loading section 206 which loads the eggs into an egg container. Simultaneously while an egg container is being loaded by the egg loading section 206, a loaded egg container is stopped on the conveyor 212 under the printing assembly 214 as shown at 802. The at least one ink printing source contained within the printing assembly 214 is positioned over at least one egg in the egg container as shown at 804. The at least one ink printing source prints data onto the exposed eggs in accordance with the desired performance parameters as shown at 806. The egg container is then advanced on the conveyor 212 as additional eggs are placed in an egg container by the egg loading section 206 as shown at 808. At 810, the eggs having data printed thereon are analyzed and examined to determine the quality and integrity of the data printed thereon as well as the structural integrity of the eggs. In response to such analysis and examination, the computer system 500, or other suitable means, determines if any of the performance parameters, environmental conditions, and/or processing conditions need to be adjusted to improve the quality or integrity of the markings applied to the eggs or the marking process as shown at 812. If it is determined that certain parameters and/or conditions need to be adjusted, such adjustments are made by any suitable means as shown at 814. The next container of eggs is then processed according to such parameters and marking process continues again as shown at 802. If it is determined that the parameters do not need to be adjusted, the marking continues again as shown at 802.

In one embodiment, at least a portion of the eggs are examined or analyzed before, during and/or after the marking process to determine the position and/or characteristics of the eggs that are to be marked and/or the quality and integrity of the information that is marked on the eggs. Any number of environmental and processing conditions may be analyzed to produce a specific optimized or improved marking on the eggs in response to the analyzed conditions.

In a preferred embodiment, a machine vision system 216 may be configured and arranged so as to the examine the position and characteristics of eggs that are to be marked and/or the quality and integrity of the information that is marked on the eggs. In some embodiments, one or more machine vision observation units or imaging sensors 218 may be positioned, for example, adjacent the printing assembly 214. In other embodiments, the one or more imaging sensors 218 may be located elsewhere to allow for adequate observation. In a preferred embodiment, the machine vision system 216 is operable to control the operation of the one or more imaging sensors 218 and to receive image data obtained from the one or more imaging sensors 218. The machine vision system 216 is also operable to receive and transmit data to the computer system 500.

As used herein, the phrase "imaging sensor" refers to a component of a vision system that captures image data, e.g., a camera or other image capturing device. In machine vision systems, one or more imaging sensors are configured and arranged to capture image data of one or more areas of interest within an operation or facility. Imaging sensors include analog video cameras, digital video cameras, color and monochrome cameras, closed-circuit television cameras, charge-coupled device sensors, complementary metal oxide semiconductor sensors, analog and digital cameras, PC cameras, pan-tilt-zoom cameras, web cameras, infra-red imaging devices, and any other devices that can capture image data. The selection of the particular camera type and selection of the connected machine vision system for a particular facility may be based on factors including environmental lighting conditions, the frame rate and data acquisition rate, and the ability to process data from the lens of the camera within the electronic circuitry of the camera control board, the size of the camera and associated electronics, the ease with which the camera can be mounted as well as powered, the lens attributes which are required based on the physical layout of the facility and the relative position of the camera to the area of interest, and the cost of the camera. In one embodiment, the system can operate a plurality of imaging sensor that gather a plurality of images concurrently. In another embodiment, the system can operate a single imaging sensor that collects images from a plurality of eggs sequentially.

In one embodiment, the system as disclosed herein may be stopped if the machine vision system 216 determines that the mark quality has fallen below a certain threshold. In some embodiments, such a system may be a closed-loop such that feedback from the machine vision system 216 may be used to control the printing assembly 214 so as to improve the quality and reliability of the process. For example, feedback from the machine vision system 216 might result in adjustment in the speed of traverse or print resolution setting in order to ensure a desired contrast level is achieved during the marking process. Additionally, or alternatively, the machine vision system 216 may examine the size, color, or other perceptible properties of the eggs to be marked and make appropriate adjustments to the performance parameters and/or process to account for such variables and thereby ensure that image quality stays consistent in spite of such variations.

The computer system 500 receives and/or generates the data files for producing the text and/or graphics on the eggs via any suitable means. In one embodiment, the computer system 500 generates the data files based on content, image data, and/or other information ("content information") received from an associated user, other computer system, device, network, or the like. In a preferred embodiment, the computer system includes a content information receiving component 520, which is any suitable software that enables the computer system 500 to receive content information.

In a preferred embodiment, the computer system 500 further includes a content information rendering component 522, which is any suitable software that enables the computer system to render and/or format content information to be applied to the food products. It is to be understood that the content information rendering component 522 suitably renders, formats, or otherwise modifies the received content information to be suitable for marking onto the food products. As used herein, the phrase "render" may be used to describe such rendering, formatting, or modification of the content.

It is to be understood that content information receiving component 520 and content information rendering component 522 may suitably be implemented as logic operable to be executed by processor 504. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit ("ASIC"), system on a chip ("SoC"), programmable system on a chip ("PSOC"), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

In a preferred embodiment, the computer system 500 receives the content information from an associated user, other computer system, device, network, or the like via the content information receiving component 520. Content information may be provided to the computer system through the input/output interface 516 via a suitable user interface device, through the communication interface 512 via the communication link 514, via a computer readable medium, or combinations thereof.

In one embodiment, the content information receiving component 520 may include the functionality to allow an associated user to select parameters, features or other options for the rendering of the content information provided ("rendering options"). For example, the user may be able to select parameters related to text which is to be rendered (i.e., font size, font type, font color, resolution, complexity, spacing, placement, etc.); and/or images which are to be rendered (i.e., image size, image type, image color, image resolution, image complexity, spacing, placement smoothing operations, etc.). The user may also be able to select parameters related to marking performance parameters. The user may further be able to select parameters associated with the egg and/or egg cartons to which the content information is to be applied, such as specific egg cartons or egg types on which the information is to be applied, and the like. The rendering option data is then associated with the content information and used in the marking of the content information on the eggs.

In some embodiments, the content information receiving component 520 may include the functionality to allow the user to review, verify, and/or approve the content information provided, as well as the selected rendering options prior to or upon submission of the content information. In a preferred embodiment, the user is able to modify or change the content information provided and/or the selected rendering options as desired. The content information provided and/or the selected rendering options may be stored in memory for future use. The content information and rendering options may be stored in memory local to the egg processing facility and/or remotely by any suitable means, and may be accessed and analyzed via any suitable means, such as statistical analysis, to determine any variations, trends, patterns, and the like.

While reference to content information being provided from a user for rendering onto a food product, it is to be understood that content information may be provided from multiple users, and the content information from each of the users may be rendered and applied to the food product. For example, an egg may have a marking applied thereon containing content information that is different from other eggs in the same batch. Further, an egg may have multiple markings applied thereon, wherein the content information for each marking is not provided from the same user.

The content information provided to the content information receiving component 520 is transmitted to the content information rendering component 522 to be rendered in accordance with the selected rendering options for applying such content information to the food product. The content information is formatted, modified, or otherwise changed suitable for marking of the information on the food product. The formatting or changing thereof is preferably based on the characteristics of the text and/or images to be rendered, the printing performance parameters, the food product characteristics, food product packaging characteristics, the environmental and processing conditions, and any combination thereof.

In each of the foregoing embodiments of systems for applying markings, in order to use data certain specific production and product information, such information is sent to the content information receiving component 520 and rendered by the content information rendering component 522. The computer system 500 can suitably correlate the output of production from the marking apparatus into datasets reflected of product type, production speeds, date, time, location, etc. and thereby calculate yield and other factors specific to production conditions, in real-time and thereafter provided this data in the form of business intelligence as needed.

Having thus described certain embodiments of systems and methods for practicing aspects of the present disclosure, it is to be appreciated that various alterations, modifications, and improvements will readily occur to those skilled in the art. Such alterations, modifications, and improvements are intended to be part of this disclosure, and are intended to be within the spirit and scope of this disclosure

The content information provided to the content information receiving component 520 is transmitted to the content information rendering component 522 to be rendered in accordance with the selected rendering options for applying such content information to the food product. The content information is formatted, modified, or otherwise changed suitable for marking of the information on the food product. The formatting or changing thereof is preferably based on the characteristics of the text and/or images to be rendered, the printing performance parameters, the food product characteristics, food product packaging characteristics, the environmental and processing conditions, and any combination thereof.

The invention claimed is:

1. A system for ink marking individual objects with indicia at an object marking component while the objects travel along at least one path through a processing system, the system comprising:
at least one processor operable to control marking of individual objects;
an object packaging component operatively coupled to the at least one processor and controlled in part by the at least one processor, wherein the object packaging component is operable to dispose at least one object in each of a plurality of object packages adapted for distribution thereof, wherein the object packaging component includes an outfeed for outputting the plurality of object packages;
a package conveyor component operatively coupled to the at least one processor and controlled in part by the at least one processor for transporting packages disposed thereon along a path, wherein the package conveyor component includes a first end positioned relative to the outfeed of the object packaging component and a second end positioned relative to a packaging offloading component, wherein the package conveyor component is configured to receive a plurality of object packages from the outfeed of the object packaging component and transport the received plurality of packages disposed thereon to the packaging offloading component at the second end;
an object marking component operatively coupled to the at least one processor and controlled in part by the at one least processor, wherein the object marking component is positioned along the package conveyor component between the outfeed of the object packaging component at the first end and the packaging offloading component at the second end, wherein the object marking component includes at least one ink marking unit positioned above the package conveyor component upon which the plurality of packages are conveyed, the at least one ink marking unit operable to mark at least one object disposed in a package with indicia as the packages pass under the at least one ink marking unit;
a non-transient memory operatively coupled to the at least one processor and operable to store data associated with the marking of the objects;
an input/output interface operatively coupled to the at least one processor;
wherein the least one processor is operable to:
obtain status data associated with at least one of at least one operational parameter of the processing system, at least one operational parameter of the at least one ink marking unit, at least one characteristic of the individual objects to be marked, at least one characteristic of the indicia to be marked thereon, and combinations thereof;
determine in response to at least a portion of the status data, at least one operational parameter of the at least one ink marking unit;
configure the at least one operational parameter of the at least one ink marking unit in accordance with such determination; and
mark the objects with the at least one ink marking unit in accordance with the at least one operational parameter to form indicia thereon.

2. The system of claim 1, wherein the status data is obtained during at least one of prior to the marking of indicia on the objects, during the marking of indicia on the objects, after the marking of indicia on the objects, and any combination thereof.

3. The system of claim 1, wherein the objects are individual eggs.

4. The system of claim 1, wherein the indicia to be marked on the eggs comprises at least one of text, graphics, and any combination thereof, and includes at least one of an advertisement, sponsored images, freshness information, traceability data, source information, and any combination thereof.

5. The system of claim 1, wherein the status data includes at least one operational parameter of an associated object-handling apparatus to which the objects are subjected prior to or after the marking thereon by the at least one ink marking unit.

6. The system of claim 1, wherein the at least one processor is further operable to:
obtain status data as to the quality of markings applied to the individual objects;
adjust at least one of the operational parameters of the processing system, at least one of the operational parameters of the at least one ink marking unit, and combinations thereof in response to the status data; and
mark the objects to be marked thereafter by the at least one ink marking unit in accordance with the at least one adjusted operational parameter.

7. The system of claim 1, wherein the at least one processor is further operable to:
obtain content marking parameters comprising at least one of content to be marked thereon, at least one rendering parameter associated with marking of the content thereon, at least one characteristic of the individual objects to be marked, and combinations thereof;
render the selected content in accordance with at least a portion of the content marking parameters; and
mark the individual objects with the selected content by the at least one ink marking unit in accordance with at least a portion of the content marking parameters.

8. The system of claim 1, wherein the at least one processor is further operable to receive at least a portion of the content marking parameters from at least one associated user via the at least one input/output interface.

9. The system of claim 1, wherein the at least one processor is further operable to:
receive at least a portion of the content marking parameters from multiple associated users via the at least one input/output interface;
generate aggregate content marking parameters based on the content marking parameters received from at least a portion of the multiple associated users;
render the selected content in accordance with at least a portion of the aggregate content marking parameters; and
mark the individual objects with the selected content by the at least one ink marking unit in accordance with at least a portion of the aggregate content marking parameters.

10. A method for ink marking individual objects with indicia at an object marking component while the objects travel along at least one path through a processing system, wherein the processing system comprises 1) a processor operable to control the processing system, 2) an object packaging component operable to dispose at least one object in each of a plurality of object packages adapted for distribution thereof, 3) a package conveyor component having a first end positioned relative to an outfeed of the object packaging component and a second end positioned relative to a packaging offloading component, wherein the package conveyor component is configured to receive a plurality of object packages from the outfeed of the object packaging component and transport the received plurality of packages disposed thereon to the packaging offloading component at the second end, and 4) an object marking component positioned along the package conveyor component between the outfeed of the object packaging component at the first end and the packaging offloading component at the second end, wherein the object marking component includes at least one ink marking unit positioned above the package conveyor component upon which the plurality of packages are conveyed, the method comprising:

disposing, by the object packaging component, at least one object into at least one object package adapted for distribution thereof and outputting the at least one object package onto the package conveyor component for transport thereon through the object marking component to the packaging offloading component;

obtaining, by the processor, status data associated with at least one of at least one operational parameter of the processing system, at least one operational parameter of the at least one ink marking unit, at least one characteristic of the individual objects to be marked, at least one characteristic of the indicia to be marked thereon, and combinations thereof;

determining, by the processor, in response to at least a portion of the status data, at least one operational parameter of the at least one ink marking unit;

configuring, by the processor, the at least one operational parameter of the least one ink marking unit in accordance with such determination; and marking, by at least one ink marking unit, at least one object disposed in at least one package with indicia as the at least one package passes under the at least one ink marking unit in accordance with the at least one operational parameter.

11. The method of claim 10, wherein the status data is obtained during at least one of prior to the marking of indicia on the objects, during the marking of indicia on the objects, after the marking of indicia on the objects, and any combination thereof.

12. The method of claim 10, wherein the objects are individual eggs.

13. The method of claim 10, wherein the indicia to be marked on the eggs comprises at least one of text, graphics, and any combination thereof, and includes at least one of an advertisement, sponsored images, freshness information, traceability data, source information, and any combination thereof.

14. The method of claim 10, wherein the status data includes at least one operational parameter of an associated object-handling apparatus to which the objects are subjected prior to or after the marking thereon by the at least one ink marking unit.

15. The method of claim 10, further comprising:
obtaining, by the processor, status data as to the quality of markings applied to the individual objects;
adjusting, by the processor, at least one of the operational parameters of the processing system, at least one of the operational parameters of the at least one ink marking unit, and combinations thereof in response to the status data; and
marking the objects to be marked thereafter by the at least one marking unit in accordance with the at least one adjusted operational parameter.

16. The method of claim 10, wherein the method further comprises:
obtaining content marking parameters comprising at least one of content to be marked thereon, at least one rendering parameter associated with marking of the content thereon, at least one characteristic of the individual objects to be marked, and combinations thereof;
rendering the selected content in accordance with at least a portion of the content marking parameters; and
marking the individual objects with the selected content by the at least one ink marking unit in accordance with at least a portion of the content marking parameters.

17. The method of claim 10, wherein the method further comprises receiving at least a portion of the content marking parameters from at least one associated user via the at least one input/output interface.

18. The method of claim 10, wherein the method further comprises:
receiving at least a portion of the content marking parameters from multiple associated users via the least one input/output interface;
generating aggregate content marking parameters based on the content marking parameters received from at least a portion of the multiple associated users;
rendering the selected content in accordance with at least a portion of the aggregate content marking parameters; and
marking the individual objects with the selected content by the at least one ink marking unit in accordance with at least a portion of the aggregate content marking parameters.

* * * * *